(12) United States Patent
Radian et al.

(10) Patent No.: US 11,790,056 B2
(45) Date of Patent: *Oct. 17, 2023

(54) SOFTWARE FEATURES LICENSING AND ACTIVATION PROCEDURE

(71) Applicant: Corning Optical Communications LLC, Charlotte, NC (US)

(72) Inventors: Eytan Radian, Hod-HaSharon (IL); Gila Shmueli, Mazkeret Batya (IL)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,959

(22) Filed: Feb. 11, 2022

(65) Prior Publication Data

US 2022/0164416 A1 May 26, 2022

Related U.S. Application Data (63) Continuation of application No. 16/848,643, filed on Apr. 14, 2020, now Pat. No. 11,250,109, which is a
(Continued)

(51) Int. Cl.
*G06F 21/10* (2013.01)
*H04L 67/00* (2022.01)
(Continued)

(52) U.S. Cl.
CPC .......... *G06F 21/105* (2013.01); *G06F 16/951* (2019.01); *G06F 21/125* (2013.01); *H04L 67/34* (2013.01)

(58) Field of Classification Search
CPC .... G06F 21/105; G06F 21/125; G06F 16/951; H04L 67/34
(Continued)

(56) References Cited

U.S. PATENT DOCUMENTS 6,321,259 B1 11/2001 Ouellette et al.
7,765,600 B2 7/2010 Saunders et al.
(Continued)

FOREIGN PATENT DOCUMENTS

| EP | 1528454 A2 | 5/2005 |
|----|----|----|
| EP | 2019364 A2 | 1/2009 |
| WO | 97/30575 A2 | 8/1997 |
| WO | 2006/028279 A1 | 3/2006 |
| WO | 2013/074795 A1 | 5/2013 |

OTHER PUBLICATIONS

International Search Report and Written Opinion of the International Searching Authroity; PCT/IL2016/050149; dated Jun. 3, 2016; 10 Pages.

*Primary Examiner* — Michael S McNally
(74) *Attorney, Agent, or Firm* — William D. Doyle (57) ABSTRACT

A computer system for providing software over a network includes: a computer system for providing software over a network is provided. The system includes: a control unit configured to reside at a site, the control unit including a control unit identification (ID) that uniquely identifies the control unit to the network; a copy of the software, the software including sets of features; a license generator configured to create a features activation file containing the control unit ID and identifying at least one set of features to be activated by the control unit; a computer configured to download the features activation file to the control unit; and, the control unit configured for activating one of the sets of features according to the features activation file. A method and a computer program product are disclosed.

20 Claims, 8 Drawing Sheets

Related U.S. Application Data continuation of application No. 16/246,655, filed on Jan. 14, 2019, now Pat. No. 10,650,122, which is a continuation of application No. 15/861,195, filed on Jan. 3, 2018, now Pat. No. 10,192,040, which is a continuation of application No. 14/617,141, filed on Feb. 9, 2015, now Pat. No. 9,881,141.

(51) Int. Cl.
*G06F 16/951* (2019.01)
*G06F 21/12* (2013.01)

(58) Field of Classification Search
USPC .............................................................. 726/8
See application file for complete search history.

(56) References Cited

U.S. PATENT DOCUMENTS

| | | | |
|---|---|---|---|
| 8,229,858 B1* | 7/2012 | Mazza | H04L 63/10 |
| | | | 705/902 |
| 2002/0133420 A1 | 9/2002 | McCoy et al. | |
| 2004/0127196 A1 | 7/2004 | Dabbish et al. | |
| 2005/0049973 A1 | 3/2005 | Read et al. | |
| 2007/0107067 A1 | 5/2007 | Fountian | |
| 2008/0021838 A1 | 1/2008 | Wardaschka et al. | |
| 2009/0119779 A1 | 5/2009 | Dean et al. | |
| 2011/0004756 A1 | 1/2011 | Caballero et al. | |
| 2012/0204269 A1 | 8/2012 | Gardner et al. | |
| 2013/0055342 A1* | 2/2013 | Choi | G06F 21/577 |
| | | | 726/1 |
| 2015/0013015 A1 | 1/2015 | Zheng et al. | |

* cited by examiner

SOFTWARE FEATURES LICENSING AND ACTIVATION PROCEDURE

CROSS-REFERENCED APPLICATION

This application is a continuation of U.S. application Ser. No. 16/848,643, filed Apr. 14, 2020, which is a continuation of Ser. No. 16/246,655, filed Jan. 14, 2019, now U.S. Pat. No. 10,650,122, which is a continuation of U.S. application Ser. No. 15/861,195, filed Jan. 3, 2018, now U.S. Pat. No. 10,192,040, which is a continuation of U.S. application Ser. No. 14/617,141, filed Feb. 9, 2015, now U.S. Pat. No. 9,881,141, the contents of which are relied upon and incorporated herein by reference in their entireties.

BACKGROUND

The disclosure relates generally to techniques for licensing software and more particularly to techniques for purchasing and activating software features over a network.

No admission is made that any reference cited herein constitutes prior art. Applicant expressly reserves the right to challenge the accuracy and pertinence of any cited documents.

As competition in the marketplace is increasingly intense, businesses continue to search for tools to improve efficiency and cut costs. Computer systems have greatly increased productivity and provided for capabilities that were not previously available.

Enterprise software is one tool that is vital to the day-to-day operation of many businesses. Generally, enterprise software provides customers with a comprehensive set of tools that is adapted for their specific business. For example, a hotel operator may implement enterprise software into a bundled solution that includes a reservation system, a payroll system, an accounting system, a financial transactions manager, a contracts management system, a customer interface, facilities management tools, and other such systems. By having an integrated system, customers are able to seamlessly manage related segments of their business.

Unfortunately, many such systems are quite expensive. Further, many segments of the business do not require the comprehensive capabilities of the bundled solution. Many customers would prefer that some portions of the business are not even provided with the superfluous portions of the enterprise software. There is simply less to manage and fewer opportunities to compromise important data.

Accordingly, some developers of enterprise software provide features as separate modules that may be added as needed. This helps to minimize expenses, and permits customers to buy additional modules when needed. Unfortunately, techniques for adding the separate modules can be time consuming and problematic. For example, traditional techniques require onsite installation. Some more advanced techniques require a remote system operator to manage security codes, certificates and other such intermediate devices to provide for remote installation.

Unfortunately, some of these techniques are time consuming and require some degree of skill to implement.

What are needed are methods and apparatus to provide for remote management of software features. Preferably, the methods and apparatus enable a user, such as a system administrator, to add or subtract software capabilities at remote locations with relative ease, and through a user-friendly interface.

SUMMARY

In one embodiment, a computer system for providing software over a network is provided. The system includes: a control unit configured to reside at a site, the control unit including a control unit identification (ID) that uniquely identifies the control unit to the network; a copy of the software, the software comprising sets of features; a license generator configured to create a features activation file containing the control unit ID and identifying at least one set of features to be activated by the control unit; a computer configured to download the features activation file to the control unit; and, the control unit configured for activating one of the sets of features according to the features activation file.

In another embodiment, a method for licensing software for a remote site is provided. The method includes: authorizing at least one software feature for the remote site through an administrator; obtaining a site identifier for the remote site, and correlating the at least one software feature with the site identifier in a downloadable features activation file; downloading the features activation file at the remote site; and, activating the at least one software feature according to the features activation file.

In yet another embodiment, a computer program product stored on non-transitory machine readable media is provided. The computer program product includes instructions for providing software over a network, the instructions including instructions for: authorizing at least one software feature for a remote site through an administrator; obtaining a site identifier for the remote site, and correlating the at least one software feature with the site identifier in a downloadable features activation file; downloading the features activation file at the remote site; and, activating the at least one software feature according to the features activation file.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

The features and advantages disclosed herein are apparent from the following description taken in conjunction with the accompanying drawings in which.

DETAILED DESCRIPTION

Disclosed herein are methods and apparatus for licensing and activating software features implemented in remote systems. The methods and apparatus provide simple processes that are easy to use. The methods and apparatus provide users with software implementations that are highly configurable and available on an as-needed basis.

Figure 1:
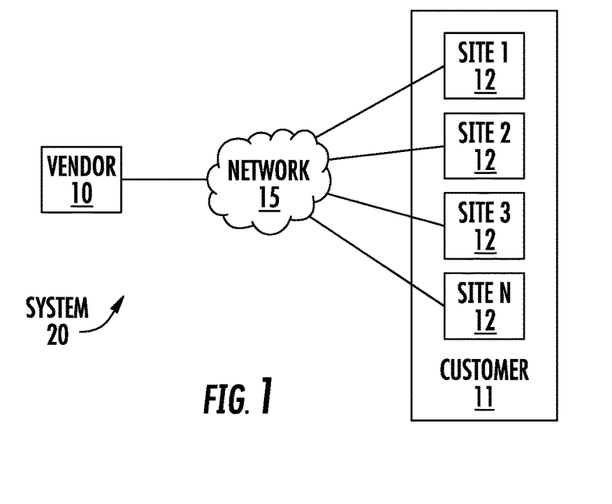
FIG. 1 is a schematic diagram depicting aspects of a licensing system according to this disclosure.

Refer now to FIG. 1 where aspects of an exemplary embodiment of a licensing system 20 for licensing and activating software are shown. In this overview, the licensing system 20 includes a vendor 10. The vendor 10 maintains a central repository that includes software for distribution and use by customer 11. The software is distributed to customer 11 through network 15. Exemplary embodiments of the network 15 include the Internet, a private network and other such networks. Each customer 11 may implement software at a number of different sites 12 (or locations).

Each site 12 has a requirement for software. In exemplary embodiments discussed herein, the software includes "user" software. For example, each site 12 may include a retail establishment that is a part of a larger corporate enterprise (which is the customer 11), and therefore implements "enterprise" software as the user software. Some sites 12 may require only modest implementations of the enterprise software. More specifically, and by way of example, some sites 12 may only require a basic software package that includes some features such as inventory tracking, time tracking, and bookkeeping. Some other sites 12 may require the basic software package, with the basic features such as inventory tracking, time tracking and bookkeeping, but may have additional needs. Examples of additional features may be implemented include an ordering system, payroll systems, contract management, project management systems, tools for financial planning and other such features. As one might imagine, in a large enterprise it may be particularly desirable to expand system capabilities on an as needed basis.

Note that the term "customer" generally refers to a single enterprise (for example, a hotel operator that operates numerous locations, or users, or "sites"). Each enterprise may include multiple locations of varying complexity. The vendor 10 may be configured to communicate with and manage software implementations for a plurality of customers 11 and therefore a multitude of sites 12.

Figure 2:
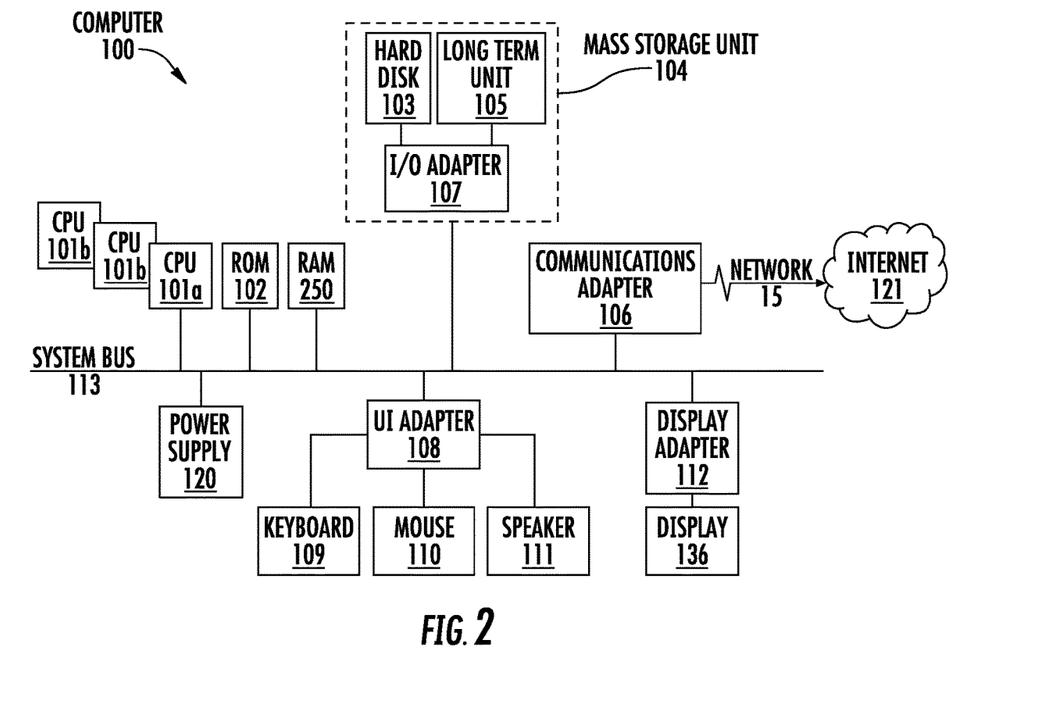
FIG. 2 is a schematic diagram depicting aspects of a computer useful for implementing the licensing system according to this disclosure.

Generally, the vendor 10, each customer 11, and each site 12 implements computing systems of an appropriate scale and complexity for the intended functions. FIG. 2 provides some context for implementations of computing systems according to this disclosure.

Referring now to FIG. 2, exemplary aspects of a computer 100 are depicted. Computer 100 has one or more central processing units (processors) 101*a*, 101*b*, 101*c*, etc. (collectively or generically referred to as processor(s) 101). Processors 101 are coupled to system memory 250 and various other components via a system bus 113. Read only memory (ROM) 102 is coupled to the system bus 113 and may include a built-in operating system (BIOS), which controls certain basic functions of computer 100.

FIG. 2 further depicts an input/output (I/O) adapter 107 and a communications adapter 106 coupled to the system bus 113. I/O adapter 107 may include parallel ATA (PATA, also called IDE or EIDE), Serial ATA (SATA), SCSI, Serial Attached SCSI (SAS), and Fibre Channel, or include any other type of interface deemed appropriate. The I/O adapter 107 generally provides for communicating with a hard disk 103 and/or long term storage unit 105 (such as a tape drive) or any other similar component (such as an optical drive). I/O adapter 107, hard disk 103, and long term storage unit 105 (and other similar components as may be included) are collectively referred to herein as mass storage 104.

A communications adapter 106 interconnects system bus 113 with an outside network 122 enabling computer 100 to communicate with other such systems. The communications adapter 106 may be supportive of at least of one of wired and wireless communication protocols. For example, the communications adapter 106 may support protocols such as wired Ethernet, Wi-Fi (e.g., 802.11 protocols), UMTS, dial-up, active-sync, cellular (using protocols such as, for example, GSM, GPRS, EDGE, CDMA, TDMA, 3G, 4G, and the like). Generally, the communications adapter 106 communicates with a network 122, and may communicate (directly or indirectly) with the Internet 121.

The computer 100 is powered by a suitable power supply 120. In some embodiments, the power supply 120 includes at least one transformer for receiving alternating current (AC) and transforming the AC into a suitable form of direct current (DC). In other embodiments, the power supply 120 includes at least one battery. The power supply may include appropriate circuitry for receiving and controlling various forms of input power.

Input/output devices are shown as connected to system bus 113 via user interface (UI) adapter 108. A keyboard 109, a pointing device (e.g., a mouse) 110, and speaker 111 may be included and interconnected to system bus 113 via user interface adapter 108. Other user interface components may be included as deemed appropriate.

A display adapter 112 connects display monitor 136 is connected to system bus 113. The display adapter 112 and/or display monitor may be configured with various components, such as a graphics adapter to improve the performance of graphics intensive applications, a video controller, a capacitive (i.e., touch screen) display, and the like.

In some embodiments, adapters 106, 107, 108 and 112 may be connected to one or more input/output (I/O) busses that are connected to system bus 113 via an intermediate bus bridge (not shown). Suitable I/O buses for connecting peripheral devices such as hard disk controllers, network adapters, and graphics adapters may include common protocols, such as the Peripheral Components Interface (PCI) bus.

Generally, the computer 100 stores machine readable instructions on non-transitory machine readable media (such as in ROM, RAM, or in the mass storage unit 104). The machine readable instructions (which may be referred to herein as "software," as an "application," as a "client, a "process," a "plug-in" and by other similar terms) generally provide for functionality as will be discussed in detail further herein.

Some of the machine readable instructions stored on non-transitory machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

The computer 100 may include, or exclude, as appropriate, the foregoing components and other components. For example, other components such as routers, bridges, firewalls, switches, servers, middleware and other components may be available. Some components may be implemented in software and/or hardware. For example, the term "server" may refer to an implementation of dedicated hardware with dedicated software running thereon. In some embodiments, the term "server" refers to a software engine running on hardware that performs other functions as well.

In some embodiments, the computer 100 may be designed and configured for stationary operation, while in some other embodiments the computer 100 is designed and configured for mobile operation. Some exemplary embodiments of commonly available mobile computers 100 that may be suited for practice of the teachings herein include laptops, smart-phones, tablets and the like.

A computing system may include a plurality of computers 100. For example, in the system, at least one computer 100 in the plurality may include substantial storage, memory, processors, mass storage and the like. Generally, such a configuration is useful as a "host computer" or a "base station." At least one computer 100 in the plurality may be designed with mobility as a primary purpose. For example, memory may replace a hard disk due to a physically compact nature of the memory. Generally, such a configuration is useful as a "mobile computer," a "mobile station" or by other similar terms.

A particular computer 100 in a computing system may be purpose-oriented. For example, a computing infrastructure may use one computer 100 principally as a file server (i.e., a data storage device for efficient storing of data within the computing infrastructure), a plurality of other computers 100 as input devices (e.g., as mobile stations operated remotely by users for interfacing with the computing infrastructure), as a console (e.g., a dedicated system for managing the computing infrastructure), and the like.

It should be recognized that some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the computer 100, and systems making use of or incorporating the computer 100, merely provides an environment for the teachings herein and is not to be construed as limiting, but as illustrative of aspects of the computer 100 and systems that incorporate the computer 100.

Given the highly configurable nature of computing systems, the term "computer" 100 is to be construed to include any configuration of components and/or software as needed to provide for the intended functions as well as extensions thereof.

Generally, the solution provided herein is a software solution that enables users at a particular site 12 to identify and activate features of third party software systems. As a matter of convention and for purposes of discussion herein, the solution is referred to as the "licensing system" 20. The third party software systems that may be enhanced through use of the licensing system 20 are referred to herein as "user software." The use of the term "user software" is merely for introduction of the exemplary embodiment, and is not limiting of the licensing system or the teachings herein. In the exemplary embodiment, the user software includes enterprise software.

In the exemplary embodiment, the licensing system 20 includes software that is maintained by the vendor 10. The licensing system 20 may be accessed by each customer 11 through the network 15 by use of, for example, a browser. In some embodiments, at least a portion of the software implemented by the licensing system 20 is maintained by the customer 11 on the hard disk 103 of a respective computer 100.

Figure 3:
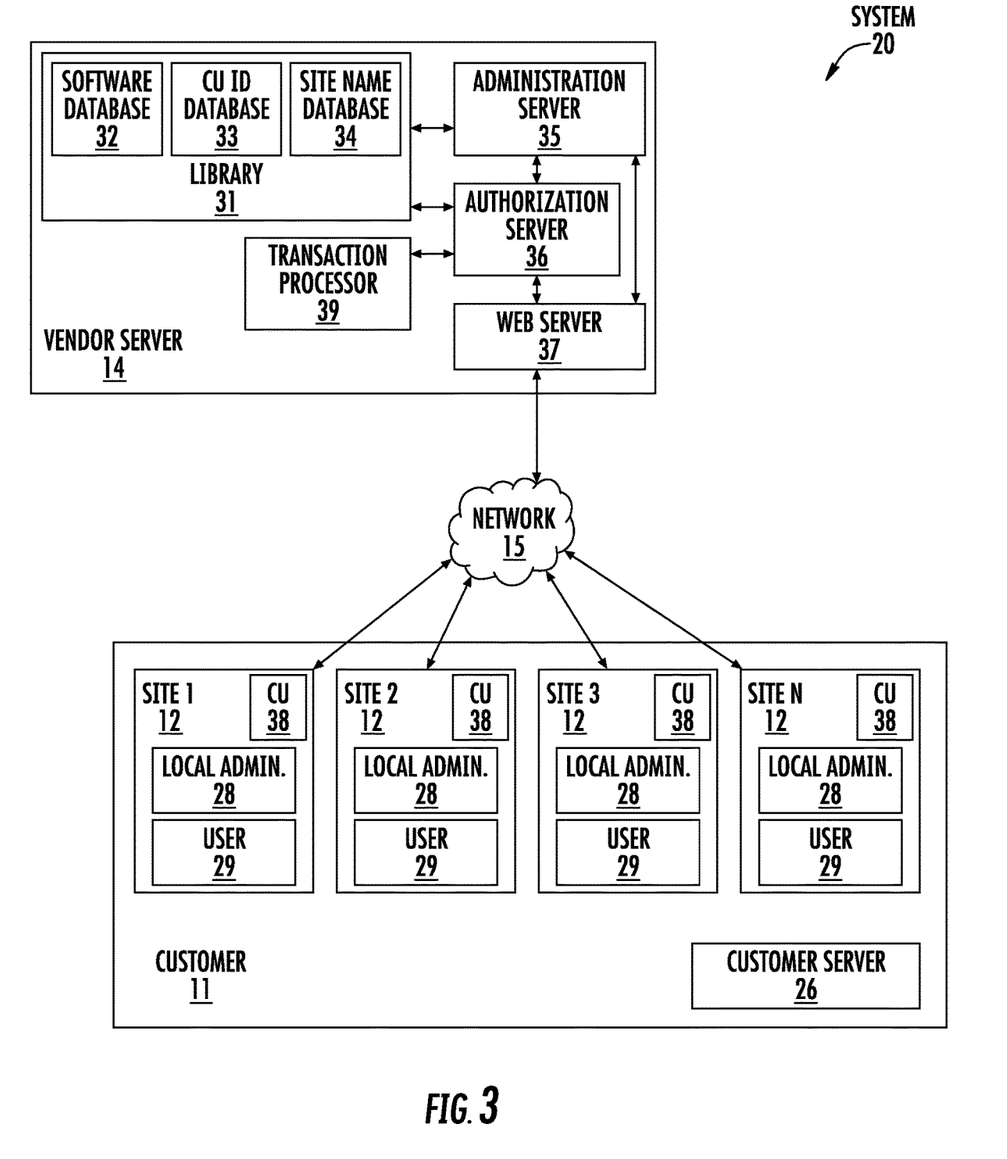
FIG. 3 is a schematic diagram depicting aspects of the licensing system of FIG. 1.

Referring now to FIG. 3, further aspects of the licensing system 20 depicted in FIG. 1 are shown. In this illustration, the customer 11 includes at least one site 12. The customer 11 may also include at least one computer 100 configured as a customer server 26. The customer server 26 may provide for, among other things, system administration by the customer 11. Each site 12 includes at least one controller unit (CU) 38. Each controller unit (CU) 38 has a unique identifier, referred to as a "CU ID." Each controller unit (CU) 38 may be implemented in hardware, or at least partially in software. The name of the site 12 and other static information related to the site 12 may be associated with or embedded into the controller unit (CU) 38. Generally, the controller unit (CU) 38 provides a resource for authenticating each of the sites 12 and for coordinating activation of features. Further functions of the controller unit (CU) 38 are discussed in greater depth further herein. Each site 12 may include a computer 100 configured as a local administrator 28, along with at least one computer 100 configured for a user 29.

In the exemplary embodiments discussed herein, each control unit ID is an embodiment of the unique site identifier. However, the licensing system 20 is not limited to embodiments of the controller unit (CU) 38 as set forth, and therefore a variety of embodiments of structures for the site identifier structures may be used.

Generally, the vendor 10 implements a vendor server 14. The vendor server 14 includes hardware and software necessary for implementing the methods described herein. In some embodiments, the vendor server 14 includes a library 31. Included within the library 31 is a software database 32 (also referred to as a "software definitions library" and by other similar terms) and a control unit identification (CU ID) database 33. The library 31 may further include a site database 34. An administration server 35 and an authorization server 36 refer to the library 31 to obtain the user software (as well as sets of features for the user software) from the software database 32. The administration server 35 and the authorization server 36 also refer to the library 31 to obtain CU ID information from the CU ID database 33. The administration server 35 and the authorization server 36 may also refer to the library 31 to obtain site information from the site database 34. The administration server 35 and the authorization server 36 communicate with each other to enable distribution of software features and to distribute those features through Web server 37. Web server 37 administers external communications with site 12 through network 15.

The vendor server 14 may further include a transaction processor 39. The transaction processor 39 may implement conventional methods for making a purchase of software licenses. For example, purchase transactions may be facilitated by a third-party processor such as a credit card company, an online processor (such as PayPal), by use of a purchase order system or by use of another suitable technique. Once the purchase transaction has been completed, the transaction processor 39 issues an appropriate confirmation to the authorization server 36.

Generally, the software database 32 includes a master copy of the user software (also referred to as "enterprise software"). The master copy of user software may be referenced by the administration server 35 to obtain user software for distribution to the site 12. The master copy of user software that is contained within the software database 32 includes an engine for implementing the user software. That is, the master copy of user software includes the fundamental components of the user software. Sets of features for the user software are also contained in the software database 32. The sets of features may be drawn upon by each customer 11 for use at selected sites 12. The sets of features contain added functionality for enhancement of the user software. That is, the sets of features include additional functionality for the fundamental components of the user software, and may be turned on or off (licensed) according to the techniques described herein. Some examples of sets of features are provided above.

In some embodiments, the master copy of user software is downloaded to each site 12 in advance and is stored there.

The software database 32 may be updated when appropriate. For example, the vendor 10 may issue updates, versions, patches, bug fixes, and other revisions to the user software. Generally, the term "software release" refers to a collection of features. The features may be new or modified. Some features may be imported from previous releases. The vendor 10 may publish new software releases from time to time. The vendor 10 may publish (that is, distribute) third-party software. For example, publication may occur on an as needed basis, or on a predetermined revision schedule. A feature code may be associated with each feature for a software release. Feature codes may be used to facilitate distribution of the sets of additional features. An exemplary table of feature codes is provided in Table 1 below.

TABLE 1

Feature Codes

| Feature | Feature Code |
|---------|--------------|
| A | 123456 |
| B | 123457 |
| C | 123458 |
| N | 12345N |

Generally, the CU ID database 33 includes information as needed for identifying each site 12 that is a licensee. That is, the CU ID database 33 includes a "Features Activation File" that contains information needed for identifying each site 12 that has paid and agreed upon price for use of the user software under an applicable license agreement. Generally, the CU ID database 33 contains a Features Activation File that includes all CU IDs purchased by each customer 11 for each of their respective sites 12. The Features Activation File includes a list of features that are "licensed" for each CU ID (and therefore, for each site 12). That is, the Features Activation File includes a list of software features allowed to be activated.

The Features Activation File is maintained and updated by the vendor 10. When a customer purchases a new set of features, the vendor 10 update the Features Activation File accordingly. The vendor 10 may update the Features Activation File on a periodic basis (for example, once a day during periods with limited computing throughput, such as at midnight). Each customer 11 may download the Features Activation File from the vendor 10 and distribute the Features Activation File to the controller unit (CU) 38. Aspects of an exemplary Features Activation File are provided in Table 2 below.

TABLE 2

Features Activation File

| CU IDs | Licensed Features |
|--------|-------------------|
| CU ID#A | A |
|  | B |
|  | C |
| CU ID#B | A |
|  | B |
|  | C |
| CU ID#C | A |
|  | B |
|  | C |
|  | D |
|  | E |
| CU ID#N | A |
|  | B |
|  | C |

The authorization server 36 may reference a "Site per CU" list. Generally, the Site Per CU list contains a list of CU IDs that were purchased by customers and the associated site information, such as site names for each site 12. The Site Per CU list is maintained and updated by the vendor 10. Among other things, the Site Per CU provides for generating the Features Activation File. Update of the Site Per CU may be performed on a periodic basis. For example, the vendor 10 may update the Site Per CU list when a respective controller unit (CU) 38 at a certain site 12 is replaced. The respective controller unit (CU) 38 may be replaced, for example, due to failure and repair activity at the site 12. Aspects of an exemplary Site Per CU list are provided in Table 3 below.

TABLE 3

Site Per CU List

| CU | Site Name |
|----|-----------|
| CU ID#A | Brandname1_location 12 |
| CU ID#B | Brandname2_location 20 |
| CU ID#C | Brandname2_location 21 |
| CU ID#N | BrandnameX_location N |

Additionally, the vendor 10 may maintain a Site Per Features list. The Site Per Features list correlates software features purchased by respective customers 11 with the site information, such as the site name for each of the associated sites 12. The Site Per Features list is used for generating the Features Activation File. Aspects of an exemplary Site Per Features list are provided in Table 4 below.

TABLE 4

Site per Features List

| Site Name | Feature Code |
|-----------|--------------|
| Brandname1_location 12 | A |
|  | B |
|  | C |
| Brandname2_location 20 | A |
|  | B |
|  | C |

TABLE 4-continued

Site per Features List

| Site Name | Feature Code |
|---|---|
| Brandname2_location 21 | A |
| | B |
| | C |
| | D |
| | E |
| BrandnameX_location N | A |
| | B |
| | C |

A general overview of exemplary system operation is now provided. Generally, one of the system administrator 26 and the local administrator 28 initiates the licensing and activation process by selecting desired sets of features. The software features may be purchased by a transaction facilitated by a third-party processor such as a credit card company, an online processor (such as PayPal), by use of a purchase order system or by use of another suitable technique. Once the purchase transaction has been completed, the transaction processor 39 issues an appropriate confirmation to the authorization server 36.

Once the transaction processor 39 has issued an appropriate confirmation to the authorization server 36, the authorization server 36 commands the administration server 35 to proceed with generation of licensing files. Specifically, the administration server 35 proceeds with generating an updated Features Activation File. The Features Activation File is then accessed by the local administrator 28 at each of the respective sites 12.

In some embodiments, the Features Activation File is updated every day, such as at midnight. The Features Activation File may be loaded onto a Web portal (i.e., Web server 37), where it is publicly accessible. A site administrator 28 may then open a browser, go to the Web portal and download the Features Activation File to the local computer. The site administrator 28 may then open up a client that is associated with the controller unit (CU) 38. By accessing the Features Activation File with a client that is associated with (hosted by) the controller unit (CU) 38 for the site 12, the controller unit (CU) 38 may identify licensed features. The controller unit (CU) 38 will then set flags, enter codes, or take other measures to activate the licensed features.

The Features Activation File may be provided in a format that is useful for updating firmware associated with the controller unit (38). This process is described in greater detail below.

Figure 4:
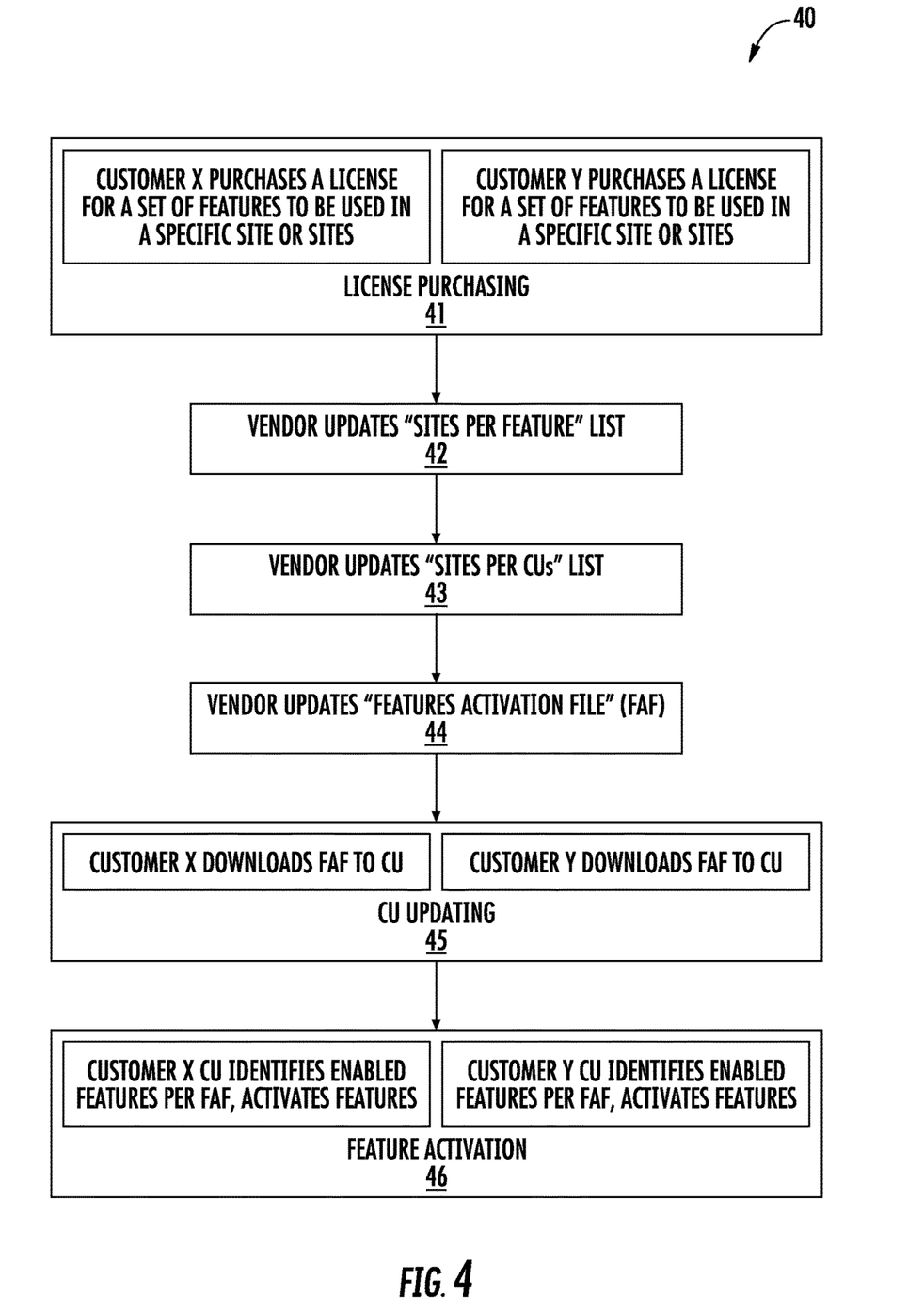
FIG. 4 is a flow chart depicting an exemplary method for licensing software features at remote sites according to this disclosure.

Having introduced aspects implemented by the vendor 10, the customer 11 and each site 12, an exemplary method for software licensing and activation is provided in FIG. 4.

FIG. 4 provides a flow chart that depicts aspects of an exemplary method for software licensing and activation 40. In a first step 41, each customer 11 proceeds with purchasing of licenses for use of software at a specific site or sites. Once the purchase transaction has been completed, the vendor 10 proceeds with steps for licensing software and/or sets of features for selected sites 12.

In a second step 42, the vendor 10 updates the Site per Features List (see Table 4). In a third step 43, the vendor 10 updates the Site Per CU list (see Table 3). In a fourth step 44, the vendor 10 updates the Features Activation File (see Table 2). In a fifth step 45, each customer 11 downloads the Features Activation File and then stores the Features Activation File in the controller unit (CU) 38. In a sixth step 46, controller unit (CU) 38 identifies enabled (that is, licensed) features in the new copy of the Features Activation File. The controller unit (CU) 38 will then activate licensed features for the site 12.

Activation of licensed features proceeds in a conventional manner. For example, in one embodiment, once the controller unit (CU) 38 has identified availability of a set of features, the controller unit (CU) 38 may authenticate and download the set of features from the vendor 10. In another embodiment, each software release is downloaded to each site 12 as the release comes available. The controller unit (CU) 38 may simply enter an appropriate code into a local copy of the enterprise software which will then activate the licensed features.

Figure 5:
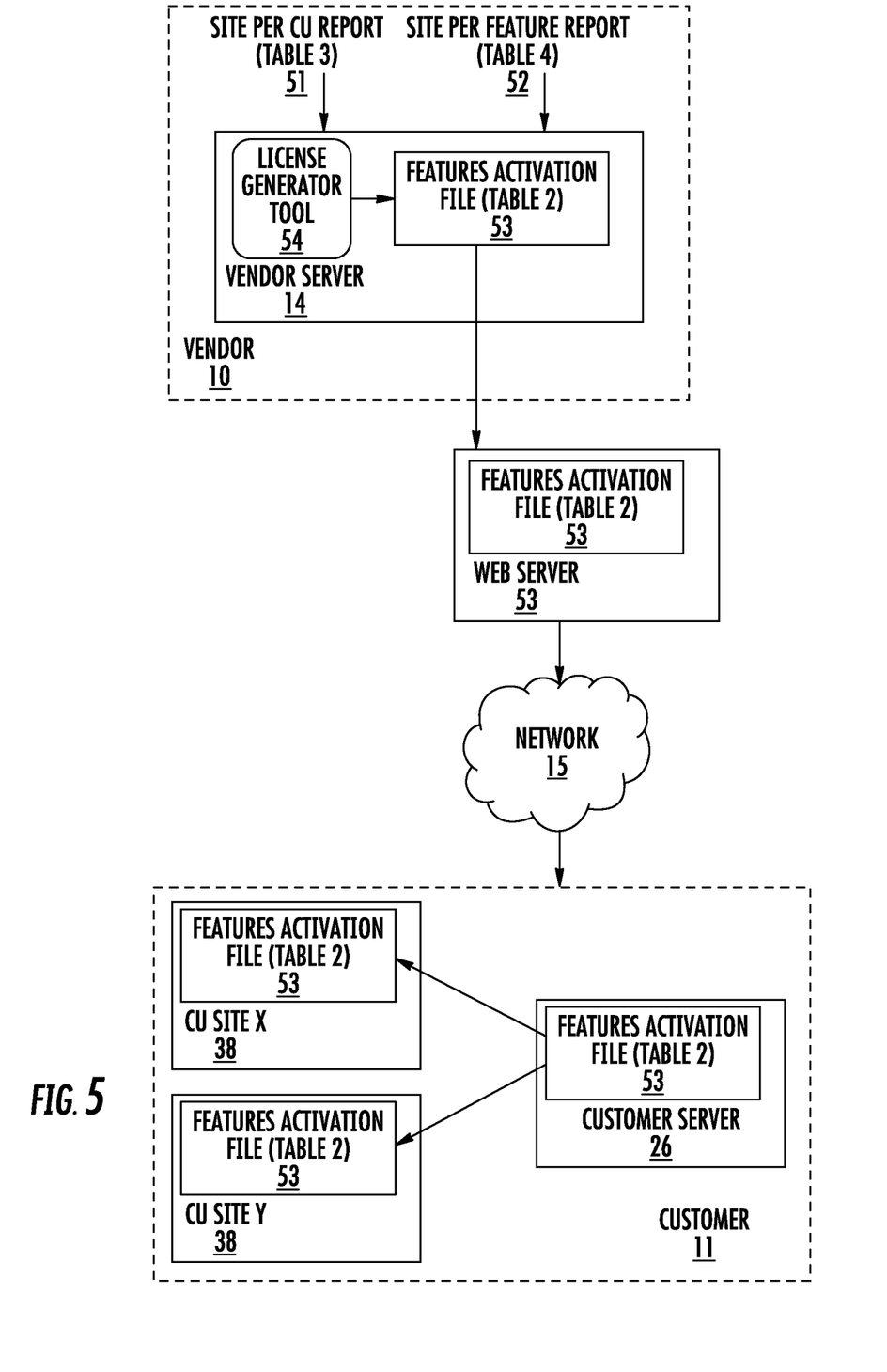
FIG. 5 is a diagram depicting another exemplary embodiment for licensing software features at remote sites according to this disclosure; and, FIGS. 6 through 10 depict a sequence of computer screen graphics for an exemplary embodiment of uploading a Feature Activation File to a controller unit (CU) according to this disclosure.

FIG. 5 illustrates aspects of another exemplary embodiment for software licensing and activation. In this embodiment, a Site per CU report 51 (as exemplified in Table 3) and a Site per Feature report 52 (as exemplified in Table 4) provide input to a license generator tool 54. The license generator tool 54 generates an appropriate Features Activation File 53 (as exemplified in Table 2).

Generally, the Site per CU report 51 and the Site per Feature report 52 may be created and provided by management tools such as SAP, which will be available for other systems such as a Purchase Order Processing system. These reports may reside on one or more data bases or may be typed or sent to the license generator tool 54 in multiple ways. Generally, the license generator tool 54 is a software application that may be operated on appropriate computing equipment (such as a personal computer or a server). The license generator tool 54 creates the "Features Activation File" from the "Site per CU Report" and the "Site per Feature Report."

Once generated, the Features Activation File 53 is downloaded periodically from to the web server 37, which provides a public portal for customer access. The customer 11 may then engage the customer server 26 (e.g. a personal computer with appropriate operating system) for communicating with the web server 37 and downloading the most updated Features Activation File 53. The Features Activation File may be first stored in a central entity for the customer 11 (such as the customer server 26), and then downloaded to the respective control unit (CU) 38 at each site 12 where the new features are to be activated.

As discussed elsewhere herein, each control unit (CU) 38 is a management control entity useful for managing equipment at the respective site 12. The control unit (CU) 38 may include hardware and software applications. Once an updated Features Activation File 53 is downloaded to the control unit (CU) 38, each control unit (CU) 38 will search the Features Activation File 53 for data intended for that control unit (CU) 38. When each control unit (CU) 38 identifies its identifiers correlated to the enabled features (the CU IDs and the enabled features' IDs appear at the "Features Activation File"), the control unit (CU) 38 will then activate the enabled features.

Having introduced exemplary embodiments, some additional aspects are now presented.

Although discussed herein as a licensing system for enhancing enterprise software through ad-hoc implementation of sets of features that were previously unavailable, the licensing system may be used equally well with other types of software. For example, the licensing system may be used to activate features for single user software packages. Exemplary software packages that may benefit from the licensing system include word processors, spreadsheets, presentation packages, email clients, browsers, database managers, illustration packages, computer aided design packages, project management packages, professional software (such as, medical software, legal software, engineering software and the like), technical implementations such as communications packages (such as those needed for management of a local area network (LAN), management of a base station (such as a cellular base station)) and any other type of software package where activation of additional features may be desired.

Although described herein as a "set of features," the additional functionality that may be licensed and activated through use of the licensing system 20 is not required to be manifested as an additional layer within an existing software package. For example, one may wish to license a set of features that is complementary to another software package (for example, a video editing tool that is complementary to or may be used with a separate, stand-alone video playback tool). In some embodiments, the licensing system 20 is used to distribute software that was previously unavailable to a customer 11. A set of features may include one to many features.

By maintaining a central software library that provides for distributing, licensing and activating features, the licensing system may provide users with updates and enhancements on a continuing and unobtrusive basis.

Advantageously, the licensing system 20 provides for a single operator (e.g., a representative of the customer 11) to control licensing and activation for a plurality of remote locations (the sites). Accordingly, a remote system administrator may take advantage of the licensing system 20 to enhance or modify software used at each one of a plurality of the remote locations.

The licensing system 20 may be used to disable sets of features as well. For example, as licensing rights expire, the associated features may be omitted from the Features Activation File. In these embodiments, each controller unit (CU) 38 is configured such that permissions are removed when a licensed has been omitted.

The licensing system 20 may be configured to provide users with an efficient and meaningful interface. For example, each customer 11 may be provided with a graphic-user-interface (GUI) may be implemented on a computer customer 11. Exemplary computer would be that of a system administrator charged with managing the enterprise software for the customer 11. The graphic-user-interface (GUI) may include a variety of components known to be used in such interfaces. Exemplary components for use in the graphic-user-interface (GUI) include, without limitation: pull-down lists, radio boxes, checkboxes, pop-up windows, fill in fields, buttons to permit browsing and upload of standardized or formatted configuration files and other such components. The graphic-user-interface (GUI) may implement auto fill features and other features as are known in the art. The graphic-user-interface (GUI) may present users with existing configurations for modification. Modification to existing configurations may include adding or subtracting software features through any of the foregoing tools for interacting with a graphic-user-interface (GUI).

Figure 6:
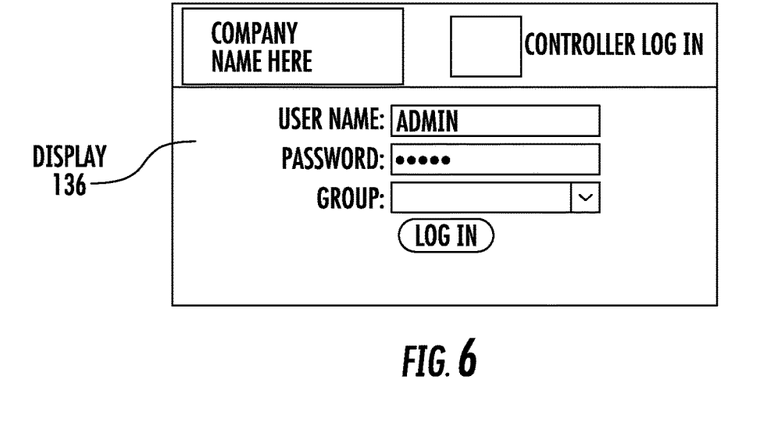
Figure 7:
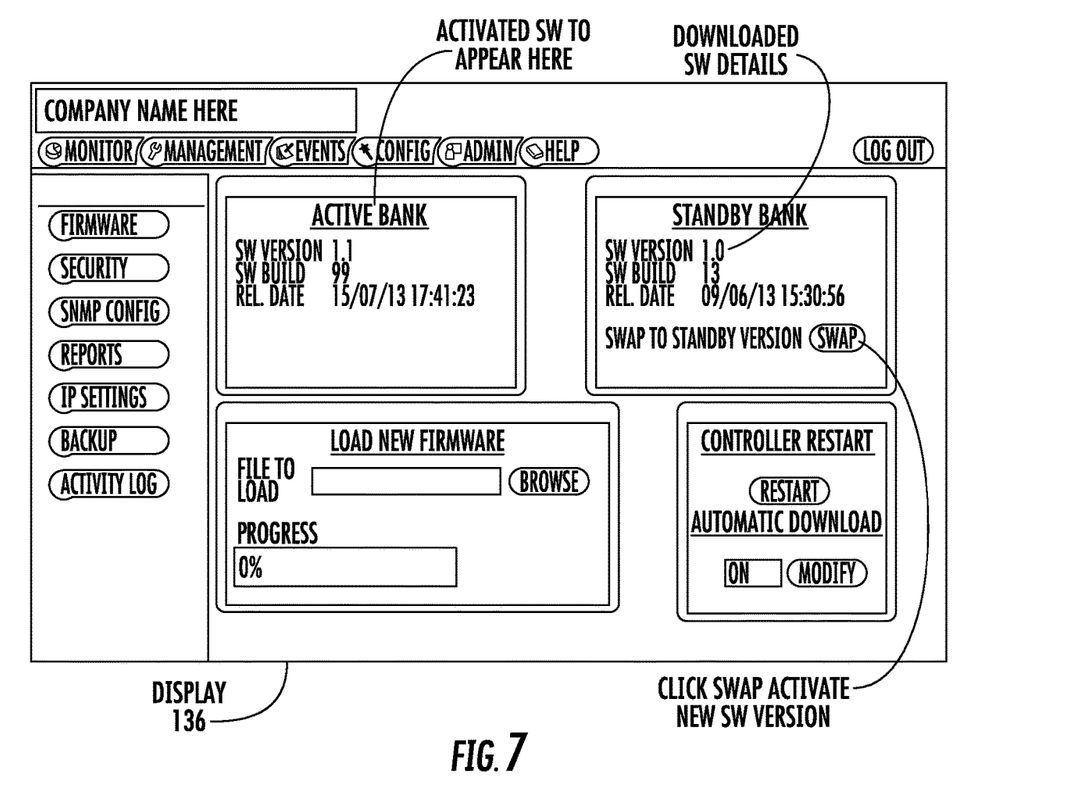
Figure 8:
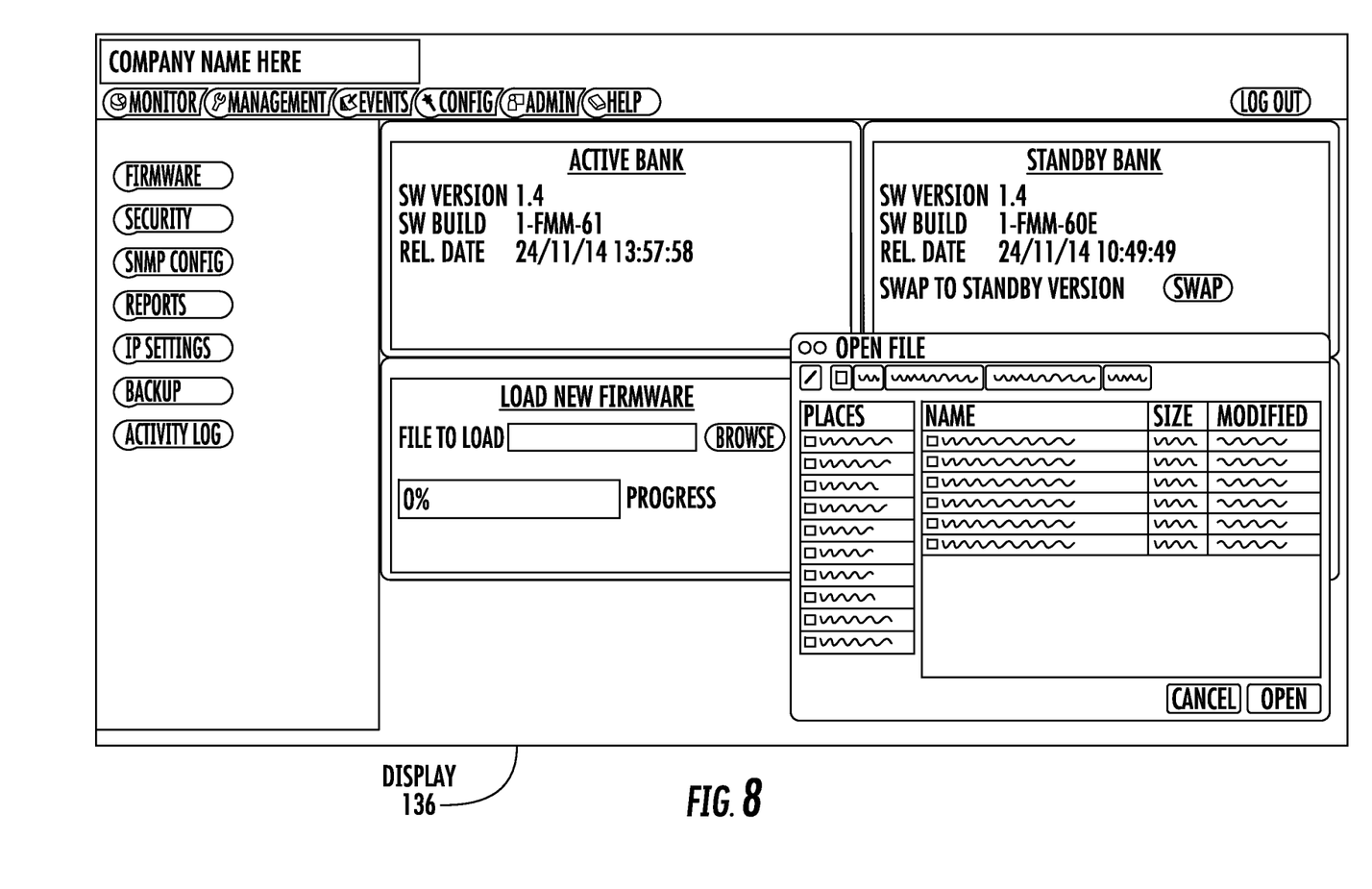
Figure 9:
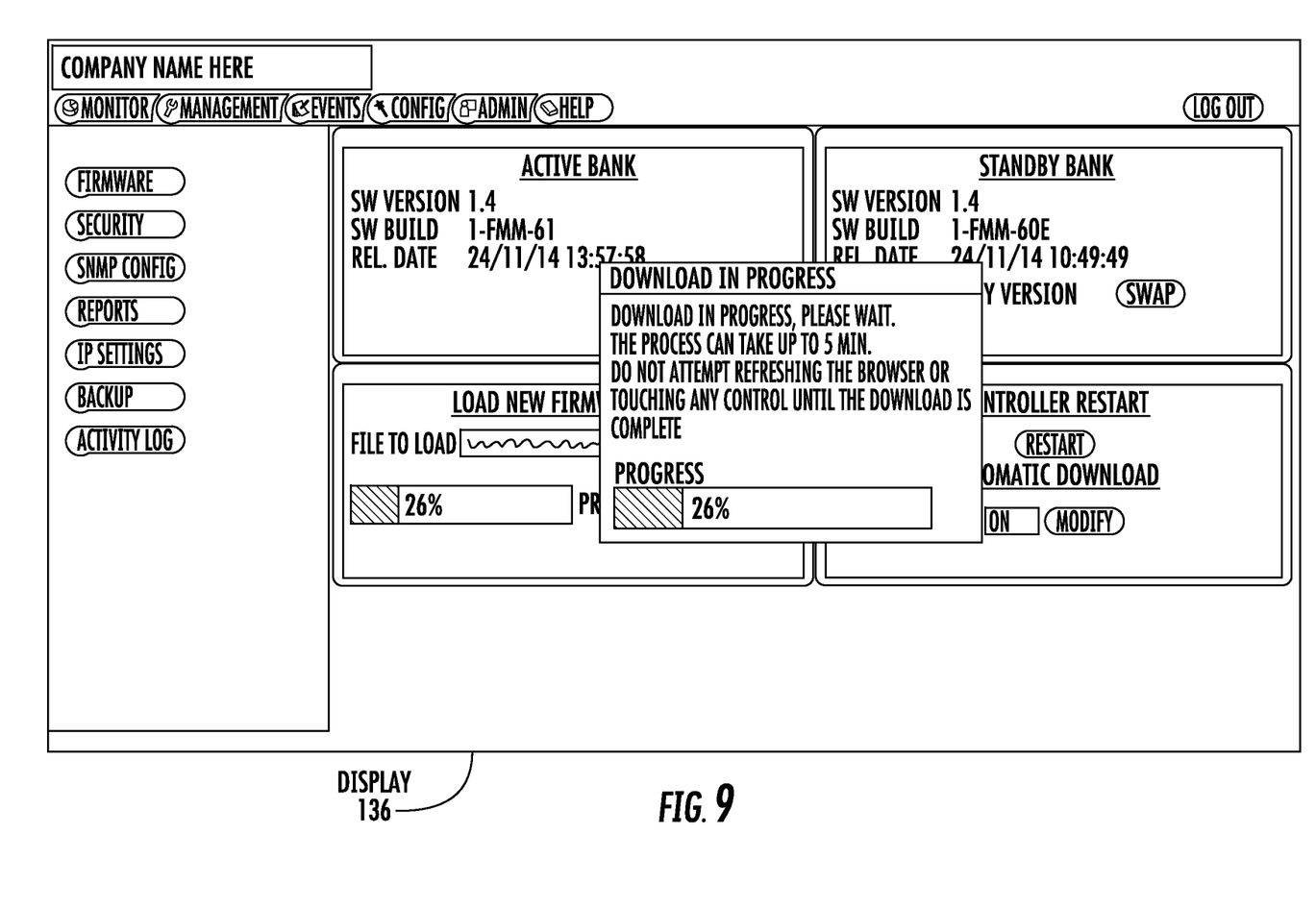
Figure 10:
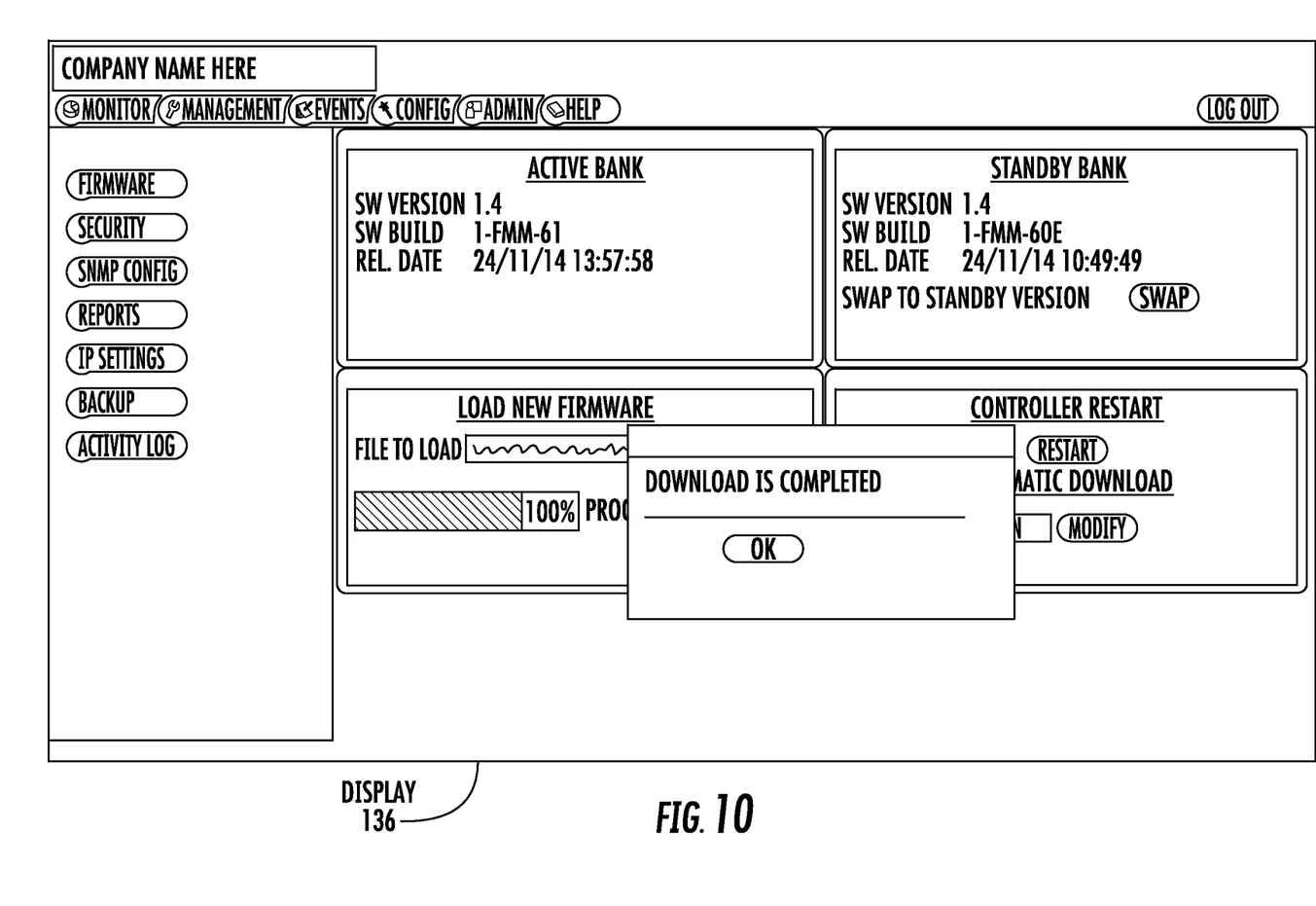

FIGS. 6 through 10 depict a sequence of computer screen graphics displayed on the display 136. The graphics depict an exemplary embodiment of uploading the Feature Activation File to the controller unit (CU) 38 by use of a client. In FIG. 6, a login screen is presented for an administrator. In FIG. 7, the administrator is provided with a control panel. The control panel includes a display of existing privileges, and a download facility for downloading of the Feature Activation File to the controller unit (CU) 38. In FIG. 8, a pop-up window has been invoked by selection of a "browse" button available at the download facility. Once the Feature Activation File has been selected and acknowledged, download commences. In FIG. 9, progress of the upload is shown by a progress bar in another pop-up window. As shown in FIG. 10, an acknowledgement may be provided.

Once the once the Feature Activation File has been downloaded, the controller unit (CU) 38 may be updated by the client without further action by the administrator.

Generally, at least some aspects of the licensing system 20 engage in automatic, semi-automatic or periodic operation. As used herein, the term "automatic" generally refers to activity that occurs without human intervention. Activity may be initiated by, for example, passage of an event, such as the downloading of a file. The term "semi-automatic" generally refers to activity that occurs with limited human intervention. The term "periodic" generally refers to activity that occurs without human intervention, and is triggered by passage of an allotted period of time.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for licensing software for a remote site of a plurality of sites, the method comprising:
providing a graphic user interface comprising at least one radio indicia, at least one pull-down list, and at least one fill-in field;
authorizing at least one first software feature for the remote site of the plurality of sites;
obtaining a control unit ID for the remote site of the plurality of sites;
correlating the at least one first software feature with the control unit ID in a downloadable features activation file;
obtaining another control unit ID for another remote site of the plurality of sites;
correlating the at least one first software feature with the another control unit ID in the downloadable features activation file;

removing at least one second software feature previously authorized for the remote site of the plurality of sites from the downloadable features activation file;

downloading the features activation file at the remote site of the plurality of sites;

activating the at least one first software feature according to the features activation file;

deactivating the at least one second software feature; and downloading the at least one first software feature over a network.

2. The method of claim 1, wherein:

the control unit ID comprises information stored in a controller unit; and the features activation file comprises a listing of control unit IDs information correlated to licensed features.

3. The method of claim 2, wherein the authorizing comprises completing a purchase and is performed by a transactions processor.

4. The method of claim 3, further comprising storing the downloaded features activation file in a controller unit.

5. The method of claim 1, further comprising adding or subtracting software features via the graphic user interface.

6. A method for licensing software for a remote site of a plurality of sites, the method comprising:

providing a graphic user interface comprising at least one radio indicia;

purchasing at least one first software feature for the remote site of the plurality of sites;

obtaining a control unit ID for the remote site of the plurality of sites;

correlating the at least one first software feature with the control unit ID in a downloadable features activation file;

obtaining another control unit ID for another remote site of the plurality of sites;

correlating the at least one first software feature with the another control unit ID in the downloadable features activation file;

removing at least one second software feature previously purchased for the remote site of the plurality of sites from the downloadable features activation file;

downloading the features activation file at the remote site of the plurality of sites;

activating the at least one first software feature;

deactivating the at least one second software feature according to the features activation file; and storing the downloaded features activation file.

7. The method of claim 6, further comprising providing an administrator a control panel.

8. The method of claim 7, wherein the control unit ID comprises information stored in a controller unit and wherein the purchasing is performed by a transactions processor.

9. The method of claim 8, further comprising downloading the at least one first software feature from a software database over a network.

10. The method of claim 6, wherein the features activation file comprises a listing of control unit IDs information correlated to licensed features.

11. A method for licensing software for a remote site of a plurality of sites, the method comprising:

providing a graphic user interface comprising at least one radio indicia;

authorizing at least one first software feature for the remote site of the plurality of sites;

obtaining a control unit ID for the remote site of the plurality of sites;

correlating the at least one first software feature with the control unit ID in a features activation file;

obtaining another control unit ID for another remote site of the plurality of sites;

correlating the at least one first software feature with the another control unit ID in the features activation file;

removing at least one second software feature previously authorized for the remote site of the plurality of sites from the downloadable features activation file;

downloading the features activation file at the remote site of the plurality of sites;

downloading the at least one first software feature from a software database over a network;

activating the at least one first software feature; and deactivating the at least one second software feature, wherein the features activation file comprises a listing of control unit IDs information related to licensed features.

12. The method of claim 11, further comprising providing an administrator a control panel.

13. The method of claim 11, further comprising storing the downloaded features activation file in a controller unit.

14. The method of claim 11, wherein the control unit ID comprises information stored in a controller unit.

15. The method of claim 14, wherein the authorizing comprises completing a purchase.

16. The method of claim 14, wherein the authorizing is performed by a transactions processor.

17. A method for licensing software for a remote site of a plurality of sites, the method comprising:

providing a graphic user interface comprising at least one radio indicia, at least one pull-down list, and at least one fill-in field;

authorizing at least one first software feature for the remote site of the plurality of sites;

obtaining a control unit ID for the remote site of the plurality of sites, and correlating the at least one first software feature with the control unit ID in a downloadable features activation file;

obtaining another control unit ID for another remote site of the plurality of sites, and correlating the at least one first software feature with the another control unit ID in the downloadable features activation file;

removing at least one second software feature previously authorized for the remote site of the plurality of sites from the downloadable features activation file;

downloading the features activation file at the remote site of the plurality of sites;

activating the at least one first software feature according to the features activation file; and deactivating the at least one second software feature according to the features activation file.

18. The method of claim 17, further comprising adding or subtracting software features via the graphic user-interface.

19. The method as in claim 18, wherein an administrator is collocated at the site or remote from the site, and the control unit ID comprises information stored in a controller unit.

20. The method as in claim 17, further comprising storing the downloaded features activation file in a controller unit, wherein the authorizing comprises completing a purchase, and wherein the authorizing is performed by a transactions processor.

* * * * *